United States Patent
Sethi

(10) Patent No.: US 10,787,926 B2
(45) Date of Patent: Sep. 29, 2020

(54) SYSTEM AND METHOD FOR SYNCHRONOUS CONDENSER CLUTCH

(71) Applicant: General Electric Company, Schenectady, NY (US)

(72) Inventor: Vineet Sethi, Houston, TX (US)

(73) Assignee: General Electric Company, Schenectady, NY (US)

( * ) Notice: Subject to any disclaimer, the term of this patent is extended or adjusted under 35 U.S.C. 154(b) by 705 days.

(21) Appl. No.: 15/356,114

(22) Filed: Nov. 18, 2016

(65) Prior Publication Data
US 2018/0142741 A1    May 24, 2018

(51) Int. Cl.
| F01D 15/10 | (2006.01) |
| F01D 5/02 | (2006.01) |
| H02J 3/18 | (2006.01) |
| H02K 7/18 | (2006.01) |

(52) U.S. Cl.
CPC ............ F01D 15/10 (2013.01); F01D 5/026 (2013.01); H02J 3/1885 (2013.01); H02K 7/1823 (2013.01); Y02E 40/32 (2013.01)

(58) Field of Classification Search
CPC ...... F01D 15/10; H02J 3/1885; H02K 7/1823; Y02E 40/32
See application file for complete search history.

(56) References Cited

U.S. PATENT DOCUMENTS

| 2,688,704 A * | 9/1954 | Christenson ............... H02J 9/08 290/4 C |
| 3,868,004 A * | 2/1975 | Clements ................. F01D 19/00 192/69.3 |
| 5,311,062 A * | 5/1994 | Farkas ..................... H02J 9/066 290/4 R |
| 5,610,500 A | 3/1997 | Giberson |
| 5,886,505 A | 3/1999 | Giberson |
| 6,093,975 A | 7/2000 | Peticolas |
| 6,140,803 A * | 10/2000 | Hurley ...................... H02J 3/42 307/87 |
| 6,897,577 B2 | 5/2005 | Weeber et al. |
| 7,615,884 B2 * | 11/2009 | McMaster ................. F03D 9/00 290/55 |
| 8,008,795 B2 * | 8/2011 | Turner .................. F03D 7/0284 290/44 |
| 8,816,521 B2 | 8/2014 | Kleen et al. |
| 8,963,350 B1 * | 2/2015 | Boulden ................. F01D 15/10 290/4 R |
| 9,350,225 B2 * | 5/2016 | Gieras ..................... F16D 27/08 |
| 9,677,430 B2 * | 6/2017 | Sackmann ............... F01K 23/10 |
| 9,752,509 B2 * | 9/2017 | Clayton .................... F02C 7/36 |
| 9,847,640 B2 * | 12/2017 | Day ...................... H02J 3/1885 |
| 10,132,362 B2 * | 11/2018 | Fujiwara .................. F03D 1/06 |
| 2004/0008010 A1 * | 1/2004 | Ebrahim ................... H02P 9/04 322/44 |

(Continued)

Primary Examiner — Christopher S Bobish
(74) Attorney, Agent, or Firm — Fletcher Yoder, P.C.

(57) ABSTRACT

A method of configuring a power generation unit for synchronous condensing operation includes coupling a clutch to a generator shaft of a generator without moving the generator along a generator axis of the generator shaft. The method also includes coupling the clutch to a turbine shaft of a turbine via a spacer without moving the turbine along a turbine axis of the turbine. Furthermore, the generator shaft is configured to support a weight of the clutch without a clutch pedestal support.

19 Claims, 2 Drawing Sheets

(56) References Cited

U.S. PATENT DOCUMENTS

| | | | |
|---|---|---|---|
| 2004/0159524 A1* | 8/2004 | Carpenter | F16D 25/0632 192/85.21 |
| 2010/0052442 A1* | 3/2010 | Savant | H02K 7/108 310/78 |
| 2010/0056315 A1* | 3/2010 | Scholte-Wassink | F16N 7/38 475/159 |
| 2012/0104754 A1* | 5/2012 | Rudolf | F03D 7/0284 290/44 |
| 2012/0306458 A1* | 12/2012 | Fogarty | H02P 9/08 322/32 |
| 2015/0123623 A1* | 5/2015 | Gulen | H02P 9/14 322/20 |
| 2016/0036230 A1 | 2/2016 | Day | |
| 2016/0053691 A1* | 2/2016 | Ernst | F02C 9/28 415/121.3 |
| 2016/0105078 A1* | 4/2016 | Santini | F02C 7/36 290/52 |
| 2018/0094550 A1* | 4/2018 | Conlon | F02C 7/16 |

* cited by examiner

SYSTEM AND METHOD FOR SYNCHRONOUS CONDENSER CLUTCH

BACKGROUND OF THE INVENTION

The subject matter disclosed herein relates to generators and synchronous condensers, and more particularly, the use of a clutch with a synchronous condenser.

Gas turbine systems generally include a compressor, a combustor, and a turbine. The combustor combusts a mixture of compressed air and fuel to produce hot combustion gases directed to the turbine to produce work, such as to drive an electrical generator or other load. A gas turbine engine combined with an electrical generator may collectively make up a power generation unit (e.g., a gas turbine generator). Such power generation units generally provide power to a power grid with an alternating current at a nominal frequency. Various loads connected to the power grid affect a power factor of the power grid. A synchronous condenser coupled to the power grid may be utilized to adjust the power factor of the power grid. Some electrical generators of power generation units may be configured to operate as a synchronous condenser. However, the modification to the power generation unit to operate as a synchronous condenser may increase a footprint of the power generation unit, thereby increasing the weight and costs associated with the power generation unit.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a turbine shaft coupled to a turbine and a generator having a generator shaft. The system also includes a clutch that engages to couple the turbine shaft to the generator shaft to drive generator shaft when the generator is in a power generation mode. The clutch also disengages to decouple the turbine shaft from the generator shaft when the generator is in a synchronous condenser mode.

In a second embodiment, a method of configuring a power generation unit for synchronous condensing operation includes coupling a clutch to a generator shaft of a generator without moving the generator along a generator axis of the generator shaft. The method also includes coupling the clutch to a turbine shaft of a turbine via a spacer without moving the turbine along a turbine axis of the turbine. Furthermore, the generator shaft is configured to support a weight of the clutch without a clutch pedestal support.

In a third embodiment, a mobile aero-derivative gas turbine system includes a turbine, a turbine shaft coupled to the turbine, and a generator having a generator shaft. The system also includes a clutch that has a synchro-self-shifting clutch that engages to couple the turbine shaft to the generator shaft to drive the generator shaft when the generator is in a power generation mode. The clutch also disengages to decouple the turbine shaft from the generator shaft when the generator is in a synchronous condenser mode.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
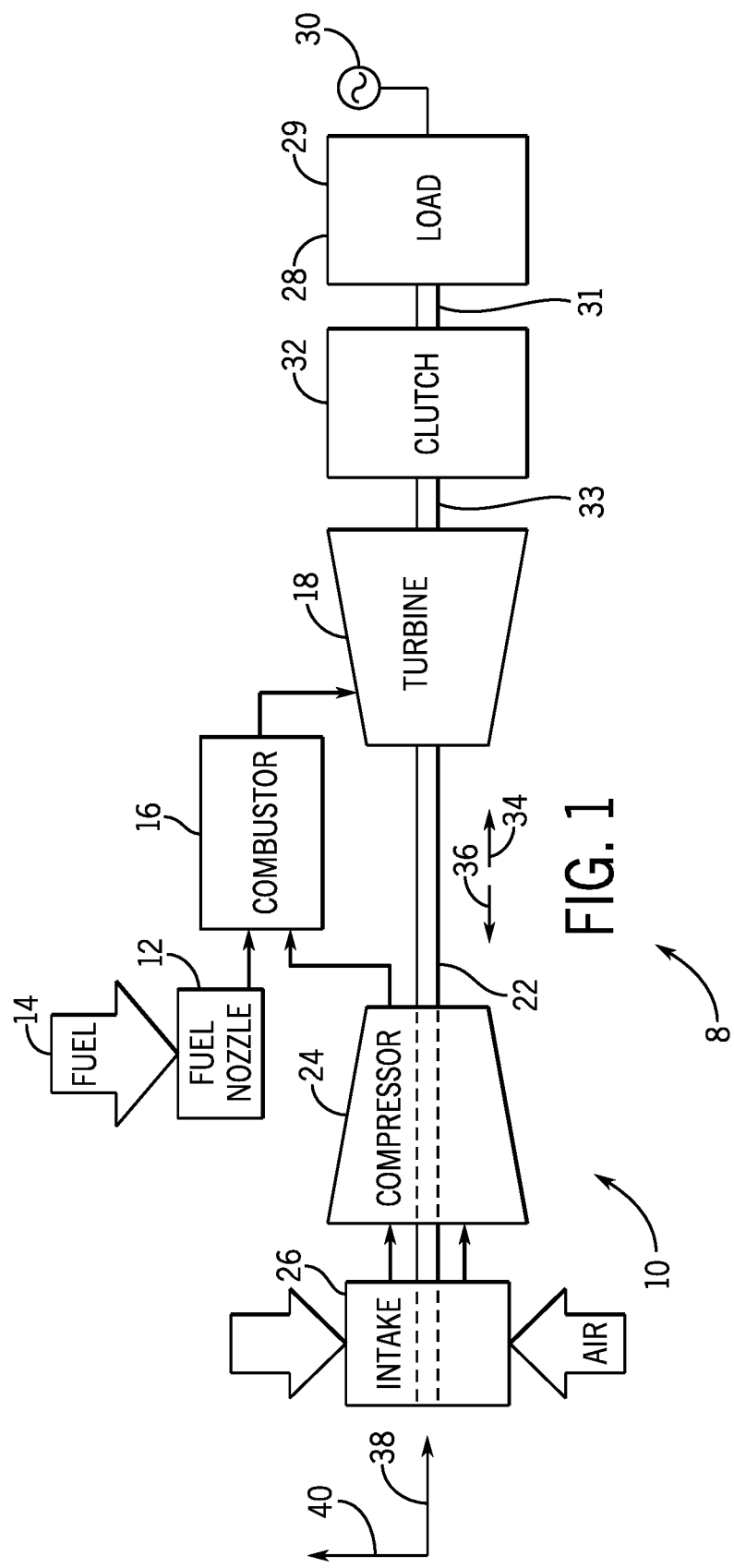
FIG. 1 illustrates a block diagram of an embodiment of a power generation unit.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The disclosed embodiments are directed to systems and methods of modifying the power of a power grid, such as by generating power to supply to the power grid or adjusting a power factor of the power grid. A power generation unit supplies power to the power grid via a generator. A generator may be powered by machinery (e.g., a gas turbine engine, steam turbine engine, reciprocating engine). The gas turbine engine may be, for example, an aero-derivative gas turbine engine. Examples of the aero-derivative gas turbine engine include the LM2500 and TM2500 series of aero-derivative gas turbines manufactured by General Electric Company of Schenectady, N.Y. The gas turbine engine may be a mobile unit configured to be transported to a site.

In some embodiments, the power generation unit may be used to stabilize a power grid. As discussed below, the disclosed embodiments of the power generation unit involve a clutch that is integrated with a generator. The clutch is configured to engage a turbine shaft with a generator shaft when the system is in a power generation mode, and the clutch is configured to disengage the turbine shaft from the generator shaft to let the generator shaft spin freely during a synchronous condenser mode. During the power generation mode, the turbine system provides power for the power grid via the generator. During the synchronous condensing mode, the generator is operated as a synchronous condenser such that the generator is driven by the power grid. The clutch may be a synchro-self-shifting clutch with a clutch housing mounted directly to the generator housing/generator flange. Integration of the clutch with the generator may enable the use of the clutch without a separate pedestal having hydraulic fittings, housing, bearings, bearing lube supply, and so forth.

The generator of the power generation unit supplies power to the power grid in a power generation mode. Various loads on the power grid draw energy from the power grid. However, some loads (e.g., reactive loads) may temporarily store energy from the power grid and return energy back to the power grid. A reactive load on the power grid may affect a power factor of the power grid because the power drawn (e.g., apparent power) by the reactive load is different than the power utilized (e.g., real power) by the reactive load. For example, there may be some power factor disturbances when power generation units are unexpectedly added or removed from a power grid, or when a load connected to the power grid is unexpectedly added or dropped. The power factor is a ratio of the real power of a circuit to the apparent power of the circuit. A low power factor may decrease transmission efficiency and increase equipment costs.

Turning now to the figures, FIG. 1 illustrates an embodiment of a power generation unit 8 with a turbine system 10. The turbine system 10 may use liquid or gas fuel, such as distillate fuel, natural gas, and/or a hydrogen rich synthetic gas, to drive the turbine system 10. As depicted, the fuel nozzles 12 intake a fuel supply 14, mix the fuel with oxidant (e.g., air, oxygen-enriched air, oxygen-reduced air), and distribute the fuel-oxidant mixture into a combustor 16 in a suitable ratio for combustion, emissions, fuel consumption, and power output. The turbine system 10 may include fuel nozzles 12 located inside one or more combustors 16. The fuel-oxidant mixture combusts in a chamber within the combustor 16, thereby creating hot pressurized exhaust gases. The combustor 16 directs the exhaust gases through a turbine 18. As the exhaust gases pass through the turbine 18, the gases force turbine blades to rotate a shaft 22 along an axis of the turbine system 10. As illustrated, the shaft 22 may be connected to various components of the turbine system 10, including a compressor 24. Blades of the compressor 24 may be driven by the shaft 22. As the shaft 22 rotates, the blades within the compressor 24 also rotate, thereby compressing oxidant (e.g., air) from an air intake 26 through the compressor 24 and into the fuel nozzles 12 and/or combustor 16.

The shaft 22 may also be connected to a load 28, such as an electrical generator in a power plant or a gas compressor in a refinery, for example. The load 28 may include any one or more suitable devices capable of being powered by the rotational output of the turbine system 10. As discussed herein, the load 28 may include a generator 29; however, it may be appreciated that the turbine 18 may drive loads in addition to the generator 29. The generator 29 may be used to provide power to a power grid 30 when the system 10 of the power generation unit 8 is in a power generation mode. In some embodiments, the generator 29 may provide a power output between approximately 20 to 120 MW when the generator is in power generation mode. This energy may be used to power the electrical grid 30.

A clutch 32 couples a generator shaft 31 to a turbine shaft 33. In some embodiments, the clutch 32 is a synchro-self-shifting clutch manufactured by the SSS Clutch Company of New Castle, Del. In other embodiments, the clutch 32 may be a dog clutch, friction clutch, or hydraulic clutch. The clutch 32 is engaged in power generation mode, thereby coupling the generator shaft 31 to the turbine shaft 33. However, the clutch 32 may be disengaged when the power generation unit 8 is in a synchronous condenser mode, thereby disconnecting the generator shaft 31 from the turbine shaft 33. In the synchronous condenser mode, the generator shaft 31 may spin freely while the generator 29 supplies reactive power to the power grid 30. Additionally, or in the alternative, the generator shaft 31 may spin freely while the generator 29 absorbs reactive power from the grid 30. The mode of the power generation unit 8 (e.g., power generation mode or synchronous condenser mode) may be controlled to adjust a power factor of the power grid 30. For example, the generator 29 may be configured to provide reactive power to the power grid 30 or to absorb reactive power from the grid 30 to maintain a power factor of the electrical power grid. Throughout the description of the disclosed subject matter, a set of directions for reference may be used, e.g., a downstream direction 34, an upstream direction 36, an axial direction 38, and a radial direction 40.

Figure 2:
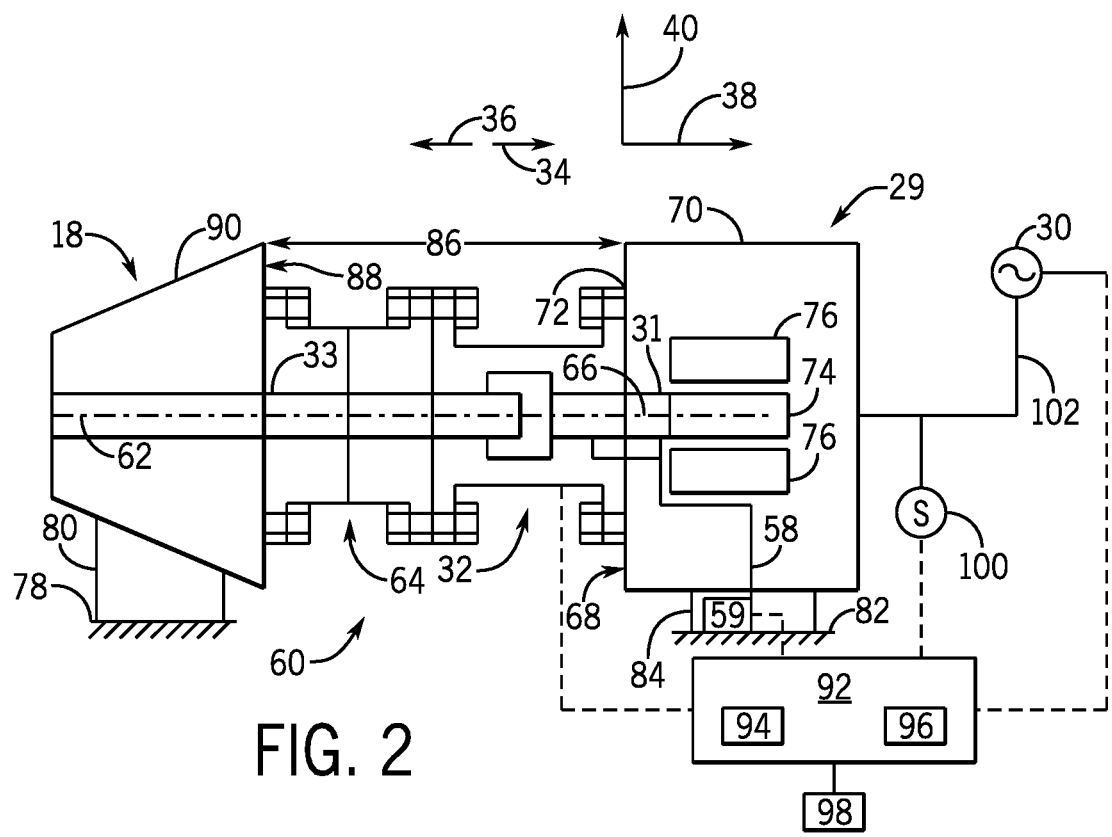
FIG. 2 illustrates a block diagram of an embodiment of a downstream portion of the power generation unit of FIG. 1.

FIG. 2 illustrates a block diagram of an embodiment of a downstream portion 60 of the power generation unit 8 of FIG. 1. In the depicted embodiment, the turbine 18 includes the turbine shaft 33, which may be a portion or extension of the shaft 22. The turbine shaft 33 rotates about a turbine shaft axis 62. The turbine shaft 33 is coupled to a coupling 64 (e.g., spacer) and to the clutch 32. The spacer 64 may be in the form of a flexible coupling. In some embodiments, the spacer 64 may be coupled to the turbine 18 via diaphragm coupling or disc coupling, and to the clutch 32 via a geared coupling.

The spacer 64 is configured to align the turbine shaft axis 62 of the turbine shaft 33 and a generator shaft axis 66 of the generator shaft 31. In other words, the spacer 64 compensates for an offset between the turbine shaft axis 62 and the generator shaft axis 66. The offset between the turbine shaft axis 62 and the generator shaft axis 66 may be in the form of a parallel offset where the axes 62, 66 are parallel but have some distance between them in the radial direction 40. The offset between the axes 62, 66 may instead be in the form of an angular misalignment where the axes are not parallel and instead, some angle is formed between the axes 62, 66. The offset between the axes 62, 66 may also be a combination of the parallel offset and the angular offset.

The spacer 64 may be coupled to the clutch 32. The clutch 32 may be mounted to an upstream end 68 of a generator housing 70. In some embodiments, the clutch 32 is mounted directly to a flange 72 of the generator 29. In some embodiments, the clutch 32 is integrated with the generator shaft 31 without a clutch support pedestal. Therefore, the clutch 32 may receive fluid support, e.g., coolant, hydraulic power, oil, lubricant, through the generator 29 and/or generator shaft 31 instead of through a separate clutch support pedestal. The generator 29 also includes a rotor 74 and stators 76. The rotor 74 is coupled to the generator shaft 31, which rotates about a generator shaft axis 66. The generator shaft 31 is also coupled to the coupling 64 and clutch 32.

As discussed above, the power generation unit 8 may be part of a mobile unit that is transported to sites of power grids. As such, the turbine 18 may be mounted to a skid 78 via a pedestal 80, and the generator 29 may be mounted to a skid 82 via a second pedestal 84. In some embodiments, the skids 78, 82 may be a common skid and the turbine 18 and generator 29 may both be mounted to common single skid. In some embodiments, the skids 78, 82 may be transportable via a truck, train, barge, or other transportation method. Because the system 10 may be transportable, a distance 86 from a downstream end 88 of the turbine 18 to the upstream end 68 of the generator 29 may be minimized. This minimized distance 86 may result in the system 10 being relatively lightweight and compact, which aids in the transportability of the system 10. As an example, the distance 86 may be approximately 85-90 inches (approximately 2.16 to 2.29 meters) for LM2500 turbines, and can vary for other turbines based upon unit placement and the engine configurations of cold end or hot end drive. In other embodiments, the distance 86 may be 2 to 2.5 meters, 1.5 to 3 meters, 1 to 3.5 meters, or 0.5 to 4 meters.

The distance 86 is minimized, at least in part, because the clutch 32 is mounted directly to the 29 generator. The clutch 32 is also integrated with the generator 29. Through integration with the generator 29, the clutch 32 may receive fluids (e.g., lubricant or coolant) and/or power through one or more supply lines 58. The supply lines 58 may direct the fluid and/or power from a source 59 (e.g., reservoir, power source). In some embodiments, the source 59 may be located in the generator 29, in the pedestal 84, or externally. Additionally, or in the alternative, the supply lines 58 may be supplied through a separate system that provides fluids. The supply lines 58 may carry the necessary fluids and/or power that aid in both the performance of the clutch 32 and the performance of the generator 29. There may be a supply line 58 coupled directly to the generator 29, directly to the clutch 32, or coupled directly to both the generator 29 and the clutch 32. In some embodiments, fluids supplied through the supply line 58 may also provide fluid to the clutch 32 to actuate the clutch 32. Additionally, or in the alternative, power supplied through the supply line 58 may also provide power to the clutch 32 to actuate the clutch 32. Thus, clutch integration with the generator 29 allows for the clutch 32 to not have its own dedicated bearings and clutch bearing support pedestals (clutch support pedestals). More specifically, clutch integration with the generator 29 may enable the clutch 32 to engage or disengage with the turbine 18 without separate elements including, but not limited to, a separate clutch lube oil skid, a separate clutch bearing, a separate clutch mesh, or any combination thereof.

In the depicted embodiment of system 10, the system 10 may cover a certain amount of area and space, i.e., a footprint. Integration of the clutch 32 with the generator 29 enables the footprint of the system 10 in the axial direction 38 to be minimized corresponding to the distance 86 as described above. Larger systems with a separate clutch support pedestal have a coupling/spacer on both sides of the clutch 32 that increase the distance between the turbine 18 and the generator 29. Moreover, larger systems without integrated clutches may enlarge the footprint with additional features, such as a clutch support (e.g., pedestal, skid) with separate hydraulic fittings, housing, bearings, and bearing lube supply. Instead, the clutch 32 of the system 10 described herein may receive benefits (e.g., fluid supply, power) of the clutch support pedestal through integration with the generator pedestal 84 without the bulk and footprint extension of a separate support pedestal. For example, the clutch 32 may be physically and operationally supported by the generator 29 and supply lines 58 via integration with the generator 29 and a generator lube supply 59. Further, the weight of the clutch 32 may be supported by the generator shaft 31 through integration of the clutch 32 with the generator 29. A moment resulting from the weight of the clutch 32 may also be supported by the generator shaft 31. Furthermore, a second coupling present between the generator and the clutch for a pedestal mounted clutch may be also be eliminated. Instead, there is only a single coupling 64 for the embodiments of the system 10 described herein, which is located between the clutch 32 and the turbine 18.

The combined weight of the second coupling and the pedestal mounted clutch may be more than the weight of the integrated clutch 32. For example, the combined weight of the spacer 64 and the clutch 32 may be approximately six times lighter (less weight) than the weight of a pedestal mounted clutch (e.g., a clutch having separate housing and bearings). Therefore, the power generation unit 8 with the integrated clutch 32 may be remain relatively lightweight and transportable (e.g., mobile).

As discussed above, in some embodiments, the power generation unit 8 may be a result of a modification of an existing mobile power generation unit. That is, the power generation unit 8 may be retrofitted with the clutch 32 to enable the generator 29 to operate in a synchronous condensing mode in addition to a power generation mode. During the modification of the mobile power generation unit, the distance 86 between the downstream end 88 of the turbine 18 and an upstream end 72 of the generator 29 may remain the same. In other words, during the coupling of the clutch 32 to the generator shaft 33 of the previously existing mobile gas turbine unit, the generator 29 (or generator housing 90) does not move in the axial direction 38 along the generator shaft axis 66. Similarly, during the coupling of the clutch 32 to the turbine shaft 33 of the previously existing mobile gas turbine unit via the spacer 64, the turbine 18 (or turbine housing 90) does not move in the axial direction 38 along the turbine shaft axis 62. Thus, modification of the power generation unit 8 to facilitate synchronous condenser operation via the integrated clutch 32 may not increase the footprint of the power generation unit 8 in the axial direction 38.

As described above in relation to FIG. 1, the system 10 may shift between a power generation mode and a synchronous condenser mode. This shift may be controlled by instrumentation such as a controller 92 (e.g., a computer-based controller) that has a micro-processor 94, a memory 96, and executable code. The micro-processor 94 may be any general purpose or application-specific processor. The memory 96 may include one or more tangible, non-transitory, machine-readable media. By way of example, such machine-readable media can include RAM, ROM, EPROM, EEPROM, CD-ROM, or other optical disk storage, magnetic disk storage or other magnetic storage devices, or any other medium which can be used to carry or store desired program code in the form of machine-executable instructions or data structures and which can be accessed by a processor (e.g., the micro-processor 94) or by any general purpose or special purpose computer or other machine with a processor (e.g., the micro-processor 94).

Further, the controller 92 may be coupled to one or more input/output devices 98 (e.g., mouse, keyboard, monitor, touch screen, network communication circuitry, speaker, microphone, toggles, switches, dials). More specifically, input devices 92 may in the form of a mouse, microphone, switches, touch screen, or any combination thereof. The operator may send a signal via an input device 98 to provide instructions to the controller to transition the power generation unit 8 from a synchronous condenser mode to a power generation mode. The operator may also send a signal via an input device 98 to provide instructions to the controller 92 to transition the power generation unit 8 from the power generation mode to the synchronous condenser mode.

Additionally, or in the alternative, the controller 92 may receive a signal from the grid 30 to transition the power generation unit 8 between the power generation mode and the synchronous condenser mode. Output devices 98 may be in the form of a user interface, monitor, digital display, dial, or a combination thereof. The operator may be able to observe information from the output device 98 such as a power factor of the electrical power grid 30, current mode of operation (e.g., synchronous condenser or power generation)

of the power generation unit 8, a health status of the power generation unit 8, or a combination thereof.

In order for the controller 92 to obtain information such as the power factor of the power grid 30, current mode of operation, or health status of the power generation 8, the controller 92 may be communicatively coupled to one or more sensors 100. The one or more sensors 100 may be current sensors, voltage sensors, power factor sensors, any other sensors, or any combination thereof. The one or more sensors 100 may be coupled directly to the electrical power grid 30, the generator 29, on a connection 102 between the generator 29 and the electrical power grid 30, any element of the power generation unit 8, or any combination thereof.

The controller 92 may also be communicatively coupled to the clutch 32 to provide instructions to transition the power generation unit 8 between modes of operation. To transition the power generation unit 8 from the power generation mode to the synchronous condenser mode, the controller 92 may be configured to control the clutch 32 to disengage the turbine shaft 33 from the generator shaft 31. To transition the power generation unit 8 from the synchronous condenser mode to the power generation mode, the controller 92 may also be configured to control the clutch 32 to engage the turbine shaft 33 and the generator shaft 31. The controller 92 may also be communicatively coupled to the one or more supply lines 58 to control the fluid flow and/or the power flow to the generator 29, the clutch 32, or any combination thereof.

As discussed above, an operator may send a signal via the input device 98 of the controller 92 to transition the mode of the power generation unit 8. The operator may send the signal to transition the mode when the power factor of the electrical power grid 30 is at an undesirable level. For example, if the power generation unit 8 is currently in the power generation mode, and the power factor is at an undesirable level, the operator may send a synchronous condensing signal to transition the power generation unit 8 to a synchronous condensing mode. In the synchronous condensing mode, the power generation unit 8 may supply or absorb reactive power in order to improve the power factor of the power grid. However, if the power generation unit 8 is currently in synchronous condensing mode, and the power factor is at an acceptable level, the operator may send a power generating signal to transition the power generation unit 8 to a power generation mode. In the power generation mode, the power generation unit 8 may convert mechanical energy to usable electrical energy.

Figure 3:
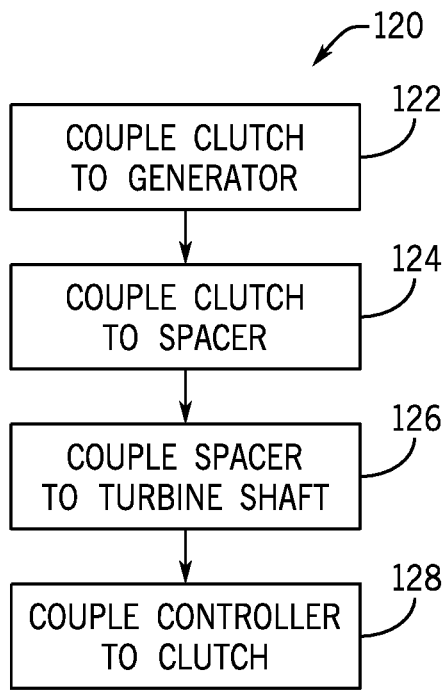
FIG. 3 illustrates a flow chart of an embodiment of a method of modifying a power generation unit.

FIG. 3 illustrates a flow chart 120 of an embodiment to assemble a power generation unit configured for power generation mode and a synchronous condenser mode. A first end of the clutch is coupled (block 122) to the generator of the power generation unit. As described above, the clutch may be integrated with the generator such that the clutch is supplied with coolant, lubricant, or power through the generator without a separate pedestal or support for the clutch itself. That is, coupling the clutch to the generator may include coupling the clutch to one or more conduits (e.g., fluid supply lines, fluid return lines, electrical lines) via the generator. In some embodiments, the clutch is coupled (block 122) to the generator shaft of the generator. A second end of the clutch is coupled (block 124) to the spacer of the power generation unit, wherein the second end is opposite the first end of the clutch. As described above, the spacer is configured to compensate or adjust for any offset or misalignment between the generator shaft and a drive shaft (e.g., turbine shaft). Moreover, the power generation unit may only have one spacer between the driver (e.g., turbine) and the generator. The spacer is coupled (block 126) to the turbine shaft, thereby connecting the turbine to the generator via the spacer and the clutch when the clutch is engaged. As discussed above, during operation, the clutch may be controlled to disengage, thereby enabling the generator shaft to rotate independently of the turbine shaft.

Furthermore, it may be appreciated that the generator and the turbine may be coupled together in a different order than as shown in FIG. 3. That is, in some embodiments the spacer may be coupled (block 126) to the turbine shaft prior to being coupled (block 124) to the clutch. Additionally, the controller may be coupled (block 128) to the clutch to enable the controller to control the engagement or disengagement of the clutch.

Technical effects of the invention include providing a compact system and method for configuring a generator of a power generation unit for either a power generation mode or a synchronous condenser mode. Integration of the clutch with the generator without a separate pedestal support for the clutch enables use of the clutch with only one coupling between the turbine and the generator. Use of the clutch without a dedicated pedestal support for the clutch may reduce the footprint of the power generation unit, as well as reduce the weight of the power generation unit. The integration of the clutch with the generator facilitates the use of a power generation unit to provide power to the power grid, or to adjust the power factor of the power grid without an additional pedestal for a separate clutch. Furthermore, because the clutch allows the gas turbine to come to a stop during the synchronous condenser mode, the gas turbine and its supporting systems may be shut down during the synchronous condenser mode. Therefore, periods of downtime may reduce the wear on the gas turbine components and their supporting systems.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system comprising:
a turbine shaft coupled to a turbine; and
a generator comprising:
a generator housing;
a generator shaft; and
a clutch disposed in a clutch housing coupled to the generator housing, wherein the clutch is directly coupled to the generator shaft, the clutch engages to couple the turbine shaft to the generator shaft to drive the generator shaft when the generator is in a power generation mode, and the clutch disengages to decouple the turbine shaft from the generator shaft when the generator is in a synchronous condenser mode;
a generator pedestal supporting the generator, wherein the generator pedestal supports both the generator and the clutch without a clutch support pedestal;
one or more clutch lines coupled to the generator pedestal and extending to the clutch housing having the clutch; and one or more generator lines coupled to the generator pedestal and extending to the generator.

2. The system of claim 1, comprising a spacer directly coupled to the turbine shaft and the clutch, wherein the turbine comprises a turbine axis, the generator comprises a generator axis, the turbine is configured to rotate about the turbine axis, the generator is configured to rotate about the generator axis, and the spacer is configured to compensate for an offset between the turbine axis and the generator axis.

3. The system of claim 2, wherein the turbine shaft, the spacer, the clutch, and the generator shaft are the only rotating components between the turbine and the generator.

4. The system of claim 1, wherein the one or more clutch lines extend from the generator housing directly to the clutch housing.

5. The system of claim 1, wherein the turbine comprises a gas turbine.

6. The system of claim 5, comprising a turbine pedestal supporting the gas turbine, wherein turbine pedestal and the generator pedestal are separate from one another.

7. The system of claim 1, wherein the one or more clutch lines comprise one or more fluid lines and one or more power lines.

8. The system of claim 1, wherein the generator is configured to provide a power output between approximately 20 to 120 MW when the generator is in the power generation mode.

9. The system of claim 1, comprising a controller coupled to the clutch and to a power grid system, wherein the controller is configured to determine a power factor of the power grid system, and the controller is configure to disengage the clutch to place the generator in the synchronous condenser mode based at least in part on the power factor of the power grid system.

10. The system of claim 9, wherein the controller is configured to control the generator in the synchronous condensing mode to increase the power factor of the power grid system.

11. The system of claim 1, comprising a controller coupled to the clutch, wherein the controller is configured to receive a synchronous condensing signal, and the controller is configured to disengage the clutch to place the generator in the synchronous condenser mode based at least in part on the synchronous condensing signal.

12. A gas turbine system comprising:
a gas turbine;
a turbine shaft coupled to the gas turbine; and
a generator comprising:
    a generator shaft;
    a clutch disposed in a clutch housing coupled to a generator housing of the generator, wherein the clutch engages to couple the turbine shaft to the generator shaft to drive generator shaft when the generator is in a power generation mode, and the clutch disengages to decouple the turbine shaft from the generator shaft when the generator is in a synchronous condenser mode; and
    a generator pedestal supporting the generator, wherein the clutch is supported by the generator without a separate pedestal, one or more clutch lines are coupled to the generator pedestal and extend from the generator housing directly to the clutch housing having the clutch, and one or more generator lines are coupled to the generator pedestal and extend to the generator.

13. The system of claim 12, wherein the one or more clutch lines comprise one or more fluid lines and one or more power lines.

14. The system of claim 12,
wherein the turbine shaft is directly coupled to the gas turbine, the turbine shaft comprises a spacer directly coupled to the clutch, the gas turbine comprises a turbine axis, and the generator comprises a generator axis,
wherein the gas turbine is configured to rotate about the turbine axis, the generator is configured to rotate about the generator axis, and the spacer is configured to compensate for an offset between the turbine axis and the generator axis.

15. The system of claim 12, comprising a controller coupled to the clutch, wherein the controller is configured to receive a synchronous condensing signal, and the controller is configured to disengage the clutch to place the generator in the synchronous condenser mode based at least in part on receipt of the synchronous condensing signal.

16. The system of claim 12, wherein the clutch is directly coupled to the generator shaft.

17. A system, comprising:
a generator mounted clutch disposed in a clutch housing configured to couple to a generator housing of a generator, wherein the generator mounted clutch is configured to directly couple to a generator shaft of the generator;
a spacer configured to mount to the generator mounted clutch, wherein the spacer is configured to couple together a turbine shaft of a gas turbine and the generator shaft of the generator;
a generator pedestal configured to support the generator, wherein the generator mounted clutch is supported by the generator without a separate pedestal;
one or more clutch lines coupled to the generator pedestal and configured to extend to the generator mounted clutch; and
one or more generator lines coupled to the generator pedestal and configured to extend to the generator.

18. The system of claim 17, comprising a power generation system having the gas turbine and the generator, wherein a turbine pedestal supports the gas turbine and the generator pedestal supports the generator.

19. The system of claim 17, wherein the one or more clutch lines are configured to extend from the generator housing directly to the clutch housing.

* * * * *